US011128481B2

(12) United States Patent
Rajasekaran et al.

(10) Patent No.: US 11,128,481 B2
(45) Date of Patent: Sep. 21, 2021

(54) HARDWARE ACCELERATED COMMUNICATION FRAME

(71) Applicant: Schweitzer Engineering Laboratories, Inc., Pullman, WA (US)

(72) Inventors: Manodev J. Rajasekaran, Pullman, WA (US); Greg Rzepka, Pullman, WA (US); Bryon S. Bridges, Liberty Lake, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 16/414,449

(22) Filed: May 16, 2019

(65) Prior Publication Data

US 2020/0112447 A1    Apr. 9, 2020

Related U.S. Application Data

(60) Provisional application No. 62/742,874, filed on Oct. 8, 2018.

(51) Int. Cl.
*H04L 12/10* (2006.01)
(52) U.S. Cl.
CPC .................................. *H04L 12/10* (2013.01)
(58) Field of Classification Search
CPC ........... H04L 12/10; H04L 12/28; H04L 1/20; H04B 1/66; H04W 28/04
See application file for complete search history.

(56) References Cited

U.S. PATENT DOCUMENTS

| 6,847,297 | B2 | 1/2005 | Lavoie | |
|---|---|---|---|---|
| 6,999,291 | B2 | 2/2006 | Andarawis | |
| 7,058,482 | B2 | 6/2006 | Fletcher | |
| 9,880,217 | B1* | 1/2018 | Volkening | G01R 31/08 |
| 2004/0047353 | A1* | 3/2004 | Umayabashi | H04L 12/18 370/395.63 |
| 2005/0169363 | A1* | 8/2005 | Logvinov | H04B 3/54 375/240 |
| 2007/0150214 | A1* | 6/2007 | Qin | G01R 19/2513 702/60 |
| 2008/0143491 | A1* | 6/2008 | Deaver | H04B 3/542 370/463 |

(Continued)

OTHER PUBLICATIONS

ABB "Substation Automation: We are energizing the digital grid I am SAM600 process bus IO system" ABB Switzerland Ltd, 2014.

(Continued)

*Primary Examiner* — Janice N Tieu
(74) *Attorney, Agent, or Firm* — Bradley W. Schield (57) ABSTRACT

Disclosed herein are systems for hardware accelerated communications between devices for the protection of electric power delivery systems. For example, a merging unit may include input circuitry that receives a monitoring signal indicating an electrical characteristic of a power line. The merging unit may include pre-payload circuitry that generates at least portions of preset metadata of a communication frame. The merging unit may include payload generation circuitry that generates payload data of the communication frame based at least in part on the electrical characteristic. The merging unit may include a communication interface that sends the communication frame to a receiving device.

21 Claims, 4 Drawing Sheets

(56) References Cited

U.S. PATENT DOCUMENTS

| | | | |
|---|---|---|---|
| 2012/0033722 A1* | 2/2012 | Varadarajan | H04L 27/2607 375/227 |
| 2012/0236879 A1* | 9/2012 | Oksman | H04B 3/54 370/474 |
| 2014/0036976 A1* | 2/2014 | Shad | H04B 3/542 375/224 |
| 2014/0072023 A1* | 3/2014 | Mellitz | H04B 3/487 375/227 |
| 2014/0074415 A1 | 3/2014 | Rudolph | |
| 2017/0331636 A1* | 11/2017 | Osagawa | H04L 12/28 |
| 2018/0145496 A1* | 5/2018 | Zeller | H02H 1/0023 |

OTHER PUBLICATIONS

Damien Tholomier and Denis Chatrefou "IEC 61850 Process Bus— It is Real!" PAC World—Winter 2008 Issue, May 2008.
Siemens "SIPROTEC 7SC805 Merging Unit for Conventional Instrument Transformer" Siemens AG, Mar. 2015.
Reason "MU320 Merging Unit", Alstom Company, 2014.
Veselin Skendzic, et al. "IEC 61850-9-2 Process Bus and Its Impact on Power System Protection and Control Reliability" Presented at the 9th Annual Western Power Delivery Automation Conference, Spokane, Washington, Apr. 2007.

* cited by examiner

HARDWARE ACCELERATED COMMUNICATION FRAME

RELATED APPLICATION

The present application claims the benefit under 35 U.S.C. § 119(e) of U.S. Provisional Patent Application No. 62/742,874 entitled "Hardware Accelerated Communication Frame Using Pre-Populated Fields", filed Oct. 8, 2018 which is herein incorporated by reference in its entirety and for all purposes.

TECHNICAL FIELD

This disclosure relates to communications among devices. More particularly, this disclosure relates to accelerating communication using hardware-controlled fields in the frame-based communication.

BRIEF DESCRIPTION OF THE DRAWINGS

Non-limiting and non-exhaustive embodiments of the disclosure are described, including various embodiments of the disclosure with reference to the figures.

DETAILED DESCRIPTION

Hardware accelerated communication frames may be used to reduce the time between when data is obtained by a sending device to the time that the data is transmitted by the sending device. Several embodiments herein are described and illustrated in relation to communications in an electrical power delivery system, but may be applied in any system that uses frame-based communications.

Devices that communicate using frame-based communications often employ a microprocessor that executes instructions related to gathering information for the communication, as well as building and populating the communication frame for transmission. For example, the frame-based communication may comply with a standard such as Ethernet, Generic Object-Oriented Substation Event (GOOSE), IEC-61850, or the like. To comply with the standard and facilitate communication, the communication frames include several fields. For instance, the frame may include pre-payload information that may include metadata of the communication frame, such as a preamble, start-of-frame identifier, destination MAC address, source MAC address, VLAN, Ethertype, or the like. The communication frame may include a payload that has the actual data that is being communicated to the receiving device. Further, the communication frame may include post-payload data, such as a frame check sequence (FCS), that may be used to check the communication frame.

Typically, a transmitting device may use a microprocessor to gather information for the different sections of the communication frame, generate the frame, and send the frame to the communication medium for transmission to a receiving device. Some of the information to be gathered may be obtained from databases such as, for example, the MAC destination, MAC source, Ethertype, and such. Different data may be used for different destinations, Ethertypes, and the like. The payload data may be obtained from various operations of the transmitting device, such as monitoring or control operations. Finally, the FCS may be calculated based on the content of the rest of the frame. Once the data is gathered, the microprocessor may build the frame, and make the populated frame available to the communication medium for transmission to the receiving device.

In several implementations, the useful lifetime of the data in the payload may be limited in time. Further, it takes time for a processor to gather the information and populate the sections of the frame, which takes away from the utility of the data for the receiving device. What is needed, therefore, is a way to accelerate the communication of data using frame-based communication.

As described below, a sending device may send communication frames to a receiving device using hardware accelerated frame-based communication. For example, the sending device may include an integrated circuit, which may be embodied as a programmable logic device (PLD), such as a field programmable gate array (FPGA). The integrated circuit may include pre-payload circuitry that outputs a signal indicating preset values of metadata in the communication frame. The pre-payload circuitry may be configured (e.g., programmed) prior to communicating frames with the receiving device (e.g., prior to or during the commissioning process). Further, the integrated circuit may include payload generation circuitry that generates payload data of the communication frame. For instance, the payload generation circuitry may generate payload data of an electrical power signal of a power line to monitor the power line of an electrical power delivery system. Further, by using the hardware of the integrated circuit to communicate the communication frame, the sending device may send data of the communication frame at a faster rate than if the communication frame were created using a processor of the sending device. For example, logic circuits of the integrated circuit may be interconnected with preset electrical connections formed in configuring (e.g., programming) the hardware of the integrated circuit such that the pre-payload circuitry outputs signals representative of the preset values in the pre-payload fields upon receiving a signal from detection circuitry to output a communication frame.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module, element, or component may, for instance, comprise one or more physical or logical blocks of computer instructions, which may be organized as a routine, program, object, component, data structure, etc., that performs one or more tasks or implements particular abstract data types.

In certain embodiments, a particular software module, element, or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium (e.g., memory) may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1:
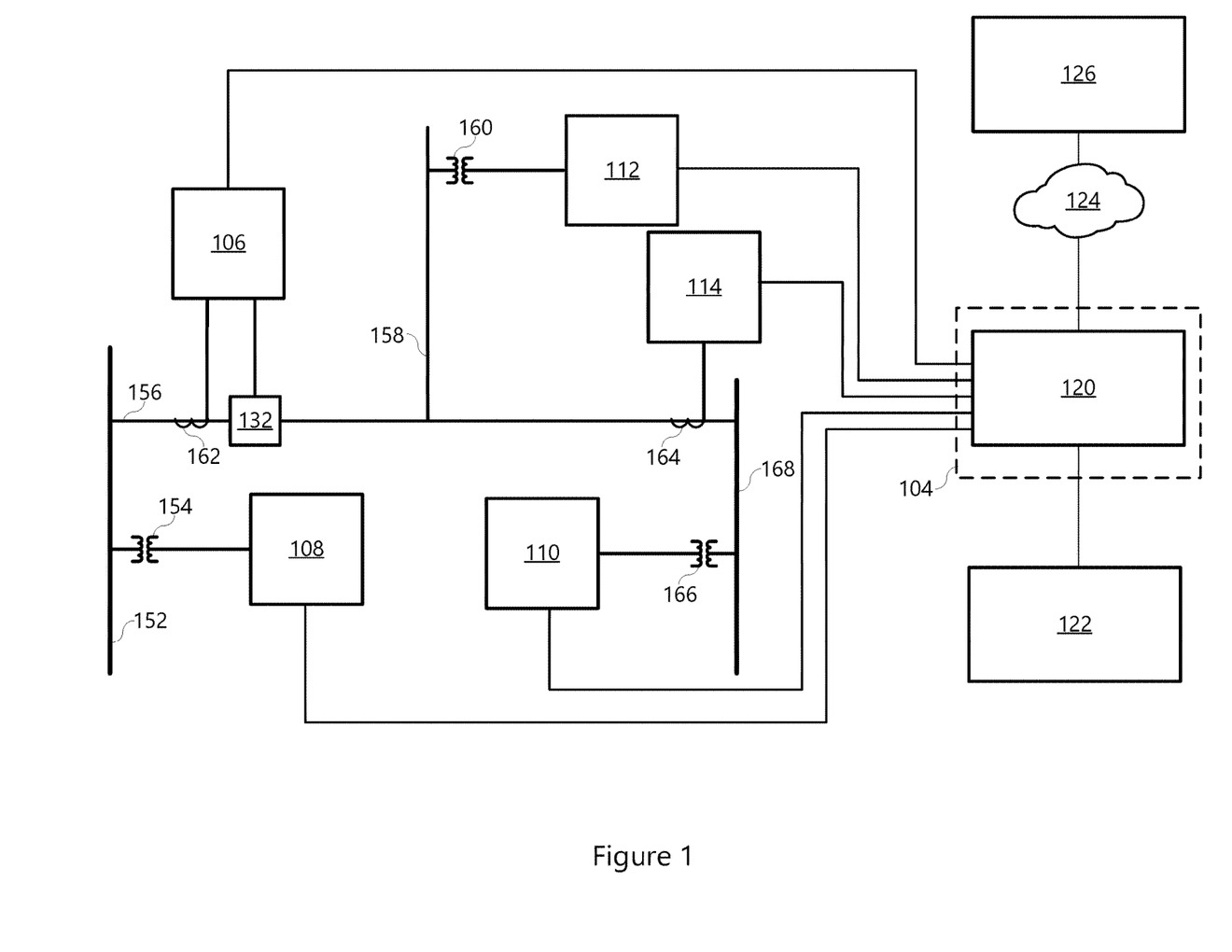
FIG. 1 illustrates a simplified one-line diagram of an electric power delivery system, in accordance with an embodiment.

FIG. 1 illustrates a simplified one-line diagram of an electric power delivery system that includes buses 152 and 168 connected using line 156, which feeds a branch 158. Voltages from bus 152 are sampled using merging unit 108 and a PT 154. Voltages from bus 168 are sampled using merging unit 110 and a PT 166. Currents at each end of line 156 are sampled using merging units 106 and 114 in communication with CTs 162 and 164, respectively. Voltages on the branch 158 are sampled using merging unit 112 in communication with PT 160. The merging units may be at different locations or within the same switchyard. The merging units are in communication with IED 120, with each merging unit connected to the IED 120 with a separate physical media for point-to-point communication with the IED 120.

The IED 120 may be in communication with several other devices such as IED 122 and IED 126. Communication may be direct point-to-point as between IED 120 and IED 122. Communication may be over a network such as network 124. IED 120 may be within a substation or control enclosure 104. IED 120 may receive and send communications with the merging units using the various communication media as illustrated which may include, for example, fiber optic communications. In various embodiments, IED 120 may control operations of equipment on the electric power delivery system using the merging units. For example, merging unit 106 may be in communication with breaker 132. Upon a command from IED 120, merging unit 106 may command breaker 132 to open and/or close.

Figure 2:
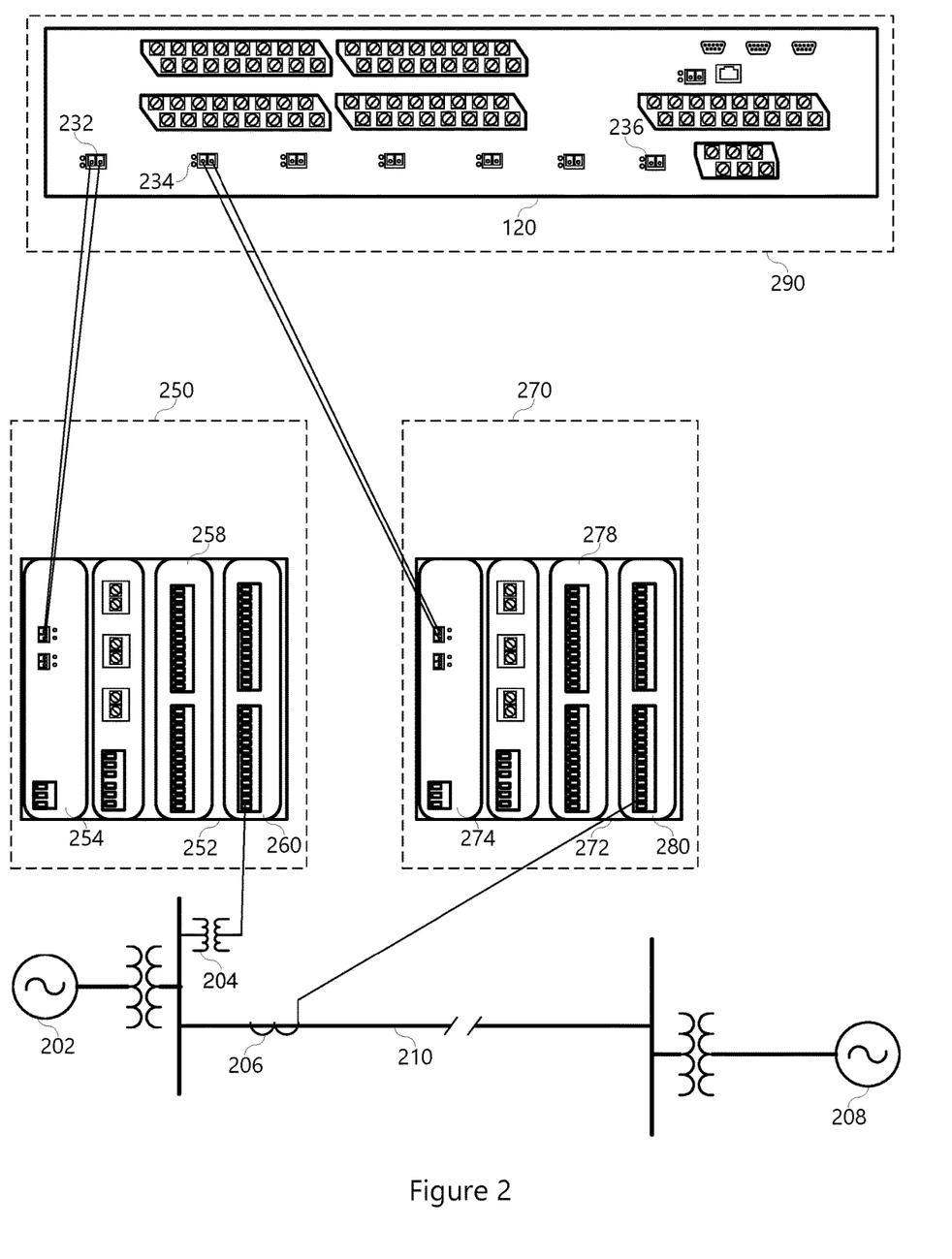
FIG. 2 illustrates a simplified block diagram of an electric power system protection device in communication with merging units for obtaining electric power system signals from the electric power system, in accordance with an embodiment.

FIG. 2 illustrates a simplified block diagram of a system for protection of an electric power delivery system, including obtaining electric power system signals from a number of merging units. Specifically, illustrated is a simplified one-line diagram of an electric power delivery system that includes generation 202 and 208 at different ends of a transmission line 210. Instrument transformers 204 and 206 are at different locations on the electric power delivery system may provide power system signals to merging units 252 and 272, respectively.

Merging unit 252 may be located in a first substation 250 near the instrument transformer(s) 204 for obtaining electric power delivery system signals from a first location, sampling and digitizing the signals, and communicating the digitized signals to IED 120. The merging unit 252 may include various input and/or output modules 258, 260 to obtain signals. As illustrated, input module 260 is in electrical communication with instrument transformer 204. Module 254 is in communication with the IED 120 to send digitized signals to the IED and receive communications from the IED.

Similarly, merging unit 272 may be located in a first substation 270 near the instrument transformer(s) 206 for obtaining electric power delivery system signals from a second location, sampling and digitizing the signals, and communicating the digitized signals to IED 120. The merging unit 272 may include various input and/or output modules 278, 280 to obtain signals. As illustrated, input module 280 is in electrical communication with instrument transformer 206. Module 274 is in communication with the IED 120 to send digitized signals to the IED and receive communications from the IED.

In normal operation, the merging units 252 and 272 obtain electric power system signals from a first location and a second location using instrument transformers 204 and 206. The merging units 252 and 272 sample and digitize the electric power system signals and communicate the signals to IED 120. The IED 120 may perform monitoring and protection functions such as differential protection of the electric power delivery system using the power system signals from the first location and from the second location. Upon detection of a fault, the IED 120 may send a command to one or both of the merging units 252 and 272 to perform a protective function such as opening a circuit breaker.

Merging unit 252 may provide communications to IED 120 using a communication medium; and merging unit 272 may provide communications to IED 120 using a communication medium. The communications may comply with a frame-based communication protocol that standardizes the frames of the communications, such as, for example, Ethernet, GOOSE, IEC-61850, or the like.

To improve performance of the protection of the IED 120, it is desired that samples from each of the merging units 252 and 272 arrive at the IED 120 with reduced latency. It is also desired that communications between the IED 120 and merging units 252 and 272 occur with reduced latency, including, for example, the communication of commands from the IED 120 to the merging unit 252 and 272 to effect protective actions, such as opening a breaker. As mentioned above, it is therefore desired to reduce the amount of time between the merging unit and the IED obtaining monitoring signal(s) or control signal(s) and transmitting communication frames. As described below, merging units 252 and 272 may include hardware accelerated communication that uses, for example, preset fields in the communication frame to improve the speed of communication and, thereby, also improve the speed of protection. As mentioned above, each communication frame may include a one or more pre-payload fields, a payload field, and one or more post-payload fields (e.g., an FCS field). By setting the pre-payload fields to preset values and beginning communication of the communication frame upon detection of a change in an electrical characteristic monitored in the electric power delivery system (e.g., without a processor being used to form the communication frame during one or more clock cycles), the speed of communication may be improved.

Figure 3:
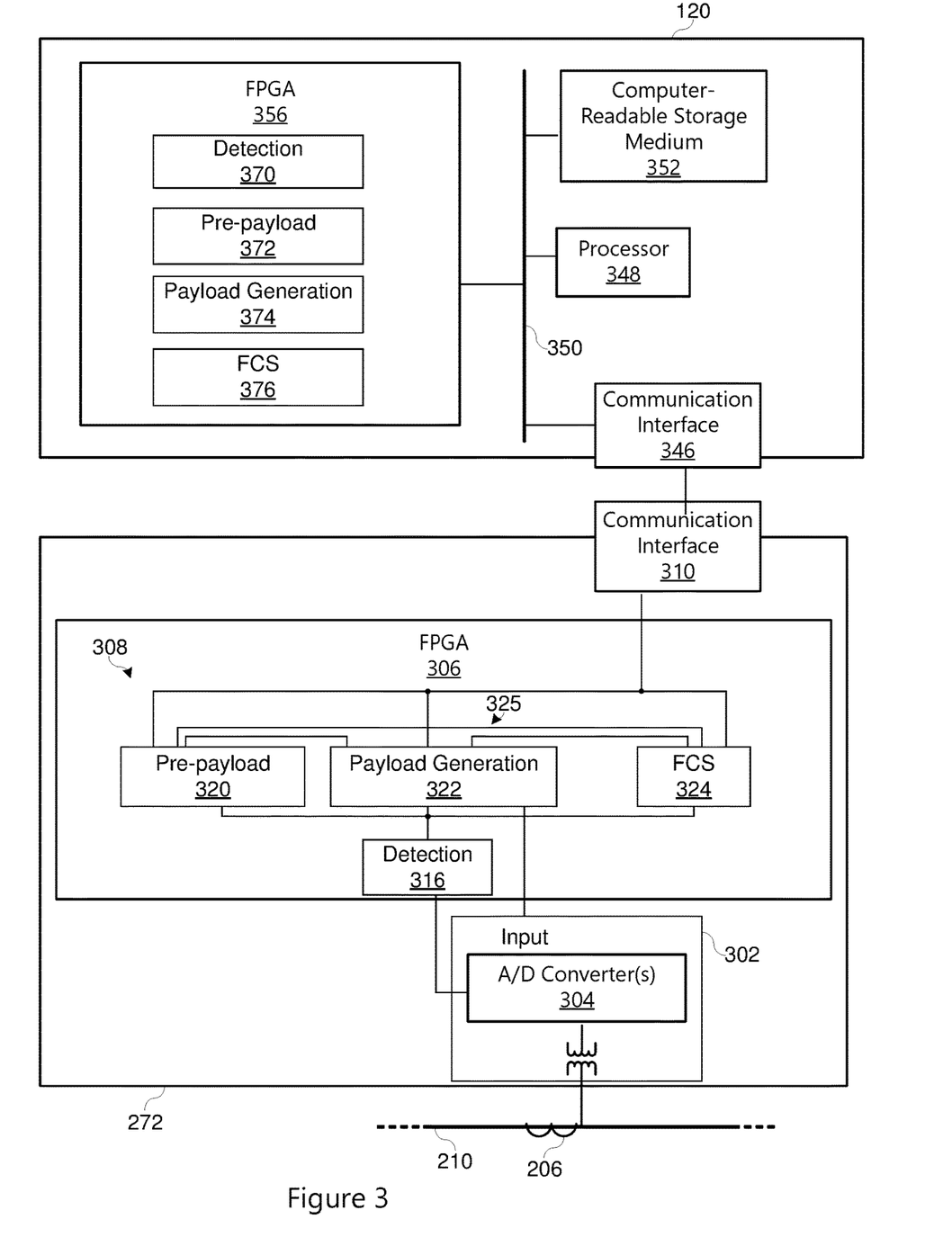
FIG. 3 illustrates a simplified block diagram of a merging unit and an intelligent electronic device (IED) using hardware accelerated communication frames, in accordance with an embodiment.

FIG. 3 illustrates a simplified block diagram of a merging unit 272 and an IED 120 in accordance with several embodiments herein. As has been suggested above, merging unit 272, in communication with the electric power system by receiving electric power system signals using instrument transformer 206, communicates electric power system signals to the IED 120 using hardware accelerated communications as described herein.

The merging unit 272 includes input circuitry 302 having an analog-to-digital A/D converter 304 in electrical communication with the instrument transformer 206. The merging unit 272 may also include in integrated circuit, such as an FPGA 306. The A/D converter 304 may obtain analog signals from the instrument transformer 206, sample, and digitize the signals, and provide the digital signals to the FPGA 306. While the A/D converter is illustrated as separate from the FPGA 306, in some embodiments, the A/D converter may be included on the FPGA 306. The FPGA 306 may be configured (e.g., programmed) to send communication frames, via the communication interface 310, based on digital signals of the A/D converter 304. Further, the FPGA 306 may allow the merging unit 272 to use frame-based communication that is accelerated by frame communication logic 308 on the hardware of the FPGA 306.

The FPGA 306 may include detection circuitry 316 that detects an event based on the digital signal(s) from the A/D converter 302. For example, if current on the power line 210 exceeds a threshold, the detection circuitry 316 may send a signal to the frame communication logic (i.e., the pre-payload circuitry 320, the payload generation circuitry 322, and the FCS circuitry 324) to cause the frame communication logic to communicate a communication frame to the IED 120 indicating the current on the power line 210.

In the illustrated embodiment, the frame communication logic 308 has pre-payload circuitry 320, payload generation circuitry 322, and FCS circuitry 324, which may be separate logic circuits that each output a portion of the communication frame to comply with the standard or protocol used in the communication. Further, the pre-payload circuitry 320, the payload generation circuitry 322, and the FCS circuitry 324 may be interconnected via one or more connections 325 between each other to provide data between the components, as described herein. In some embodiments, each of the pre-payload circuitry 320, the payload generation circuitry 322, and/or the FCS circuitry 324 may be operatively connected to the detection circuitry 316 to receive signals from the detection circuitry 316 and/or operatively connected to the communication interface 310 to send signals to the receiving device.

The pre-payload circuitry 320 may include a memory that has pre-payload metadata to populate into metadata fields that may be stored on the memory prior to monitoring the power line 210 (e.g., pre-populated in memory). For example, the pre-payload data may include information such as a preamble, start-of-frame identifier, destination MAC address, source MAC address, VLAN (if present), and EtherType that may be set to certain values during configuration of the FPGA 306.

For certain communications, this information may be identical for each frame being communicated on the particular communication interface 310. For instance, for point-to-point communications with a single recipient for each single communication interface of the merging unit, each communication frame may contain an identical preamble, start-of-frame identifier, destination MAC address, source MAC address, and EtherType. In some embodiments, some of the pre-populated communication frame fields may be the same in each communication frame communicated by the merging unit 272, while some of the pre-populated communication frame fields may be determined during operation of the merging unit 272 and before communication of the payload data. In the embodiments as illustrated herein, the memory of the pre-payload circuitry 320 stores the pre-payload fields in the communication frame such that the pre-payload circuitry 320 may output, via the hardware of the FPGA 306, the pre-payload metadata.

Upon receiving a digital signal from the A/D converter 304, the payload generation circuitry 322 generates a payload based upon the digital signal according to the protocol in which messages are being communicated to the IED 120. The payload data may then be transmitted to the communication interface 310 for communication to the IED 120. In some embodiments, the payload generation circuitry 322 may generate the payload during (e.g., in parallel with) the output of the pre-payload circuitry 320 of the fields in the communication frame before the payload.

The FCS circuitry 324 may output a signal indicating a frame check sequence of the communication frame. For example, the FCS circuitry 324 may send a signal indicating a calculated value that is based on the of the pre-payload data and payload data in the frame to allow for detection of errors in communication of the frame.

In some embodiments, the communication frame may be transmitted using the communication interface 310 (e.g., a fiber optic connector) to the communication interface 346 (e.g., a fiber optic connector) of IED 120 via a fiber optic connection. The communication frame may be made available to the processor 348 via bus 350 for use in the monitoring and protection functions of the IED 120. Computer-readable storage medium 352 may be the repository of instructions for execution on the processor 348. The instructions may include instructions for processing communication, monitoring functions, protection functions, and the like.

In several embodiments, the IED 120 may also include an FPGA 356 for hardware accelerated communication to merging unit 272. In several embodiments, the IED 120 may communicate requests and/or commands to the merging unit 272. In one example, the merging unit 272 may be in communication with a switch or circuit breaker of the electric power delivery system. The IED 120 may perform protection calculations and, resulting from the protection calculations, send an open or trip command to the merging unit 272, whereupon the merging unit 272 may receive the command and send a signal to the circuit breaker to open based upon the received command.

Similar to the FPGA 306 of the merging unit 272, the FPGA 356 of the IED 120 may include detection circuitry 370, pre-payload circuitry 372, payload generation circuitry 374, and FCS circuitry 376 similar to the descriptions of the detection circuitry 316, pre-payload circuitry 320, payload generation circuitry 322, and FCS circuitry 324, respectively. Further, the components 370-376 of the FPGA 306 may be interconnected as discussed above. Additionally, one or more of the detection circuitry 370, 372, 374, and 376 may be operatively coupled to a communication bus 350 to send and/or receive signals via the processor 348 and the communication interface 346. The FPGA 356 may be configured with preset metadata fields for sending communication frames to the merging unit 272. Upon receipt of a command from the processor 348, the pre-payload circuitry 370 may output the preset metadata fields of the communication frame. Further, the payload generation circuitry 372 may generate a payload having a command in the communication frame upon receiving the command from the processor 348 (e.g., during communication of the pre-payload data). The payload may then be transmitted, via the communication interface 324, to the merging unit 272 following communication of the pre-payload data. In other embodiments, each of the fields in the communication frame may be preset on the FPGA 356. For instance, in addition to presetting the pre-payload fields, the command to cause the merging unit to open the circuit breaker in the payload may be preset, as well as the FCS field. By using the hardware of the FPGA 356, communication frames having commands to open or close circuit breakers of the merging unit may be delivered faster than communication frames formed via the processor 348.

Figure 4:
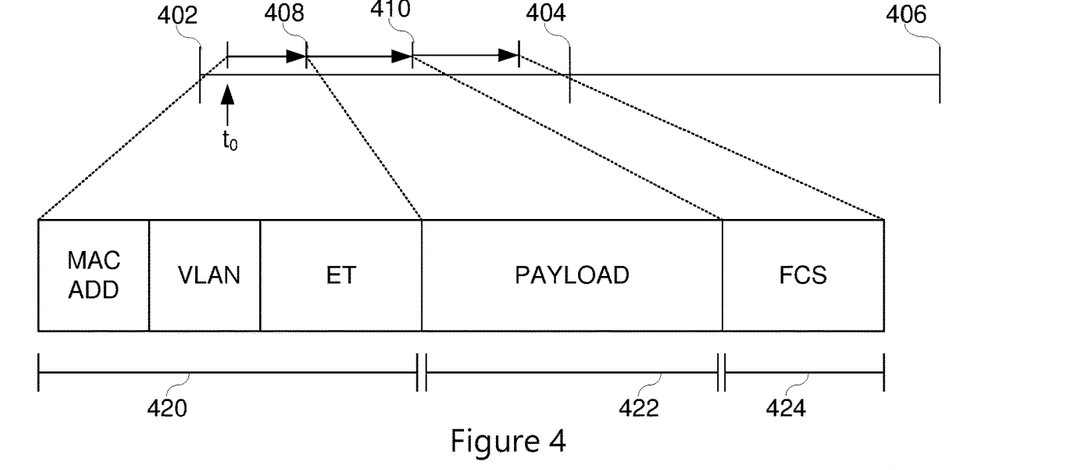
FIG. 4 illustrates a time diagram in which a communication frame is sent using hardware accelerated communication, in accordance with an embodiment.

FIG. 4 illustrates a time diagram of hardware accelerated frame based communication as described in FIG. 3. In merging units that use processor-based communication, a communication frame may be detected and communicated according to the clock cycle of the processor. In embodiments that use hardware accelerated frame based communication, the hardware may communicate data upon detection of an event in the electric power signal.

The communication frame may include fields to satisfy a standard to communicate data. This may include pre-payload data 420, payload fields 422, and FCS data 424. In processor-based merging units, if an event is detected at time t0 (after clock cycle 402), a communication frame may begin being created at the following clock cycle 404. In hardware accelerated frame based communication, the FPGA 306 may begin providing, via the frame pre-payload circuitry 320, portions of a communication frame upon detection of the event at time t0 independent of oscillation of a clock (e.g., clock cycles 404 and 406), as in a processor-based merging unit. Further, during communication of the frame pre-payload fields (between time t0 and time 408), the payload generation circuitry 322 may prepare the payload of the communication frame. Following communicating of the pre-payload fields, the payload generation circuitry 322 may then communicate the payload data. Upon communicating the payload data, the FCS circuitry 324 may then communicate the FCS of the communication frame. In some embodiments, the pre-payload circuitry 320, the payload generation circuitry 322, and the FCS circuitry 324 may be interconnected to allow communication between the components of when each component has communicated the respective portion of a frame. For example, the pre-payload circuitry 320 may notify the payload generation circuitry 322 to allow the payload generation circuitry 322 to begin communication at time 408, and a similar process may be performed with the FCS circuitry 324 from the payload generation circuitry 322 at time 410.

Figure 5:
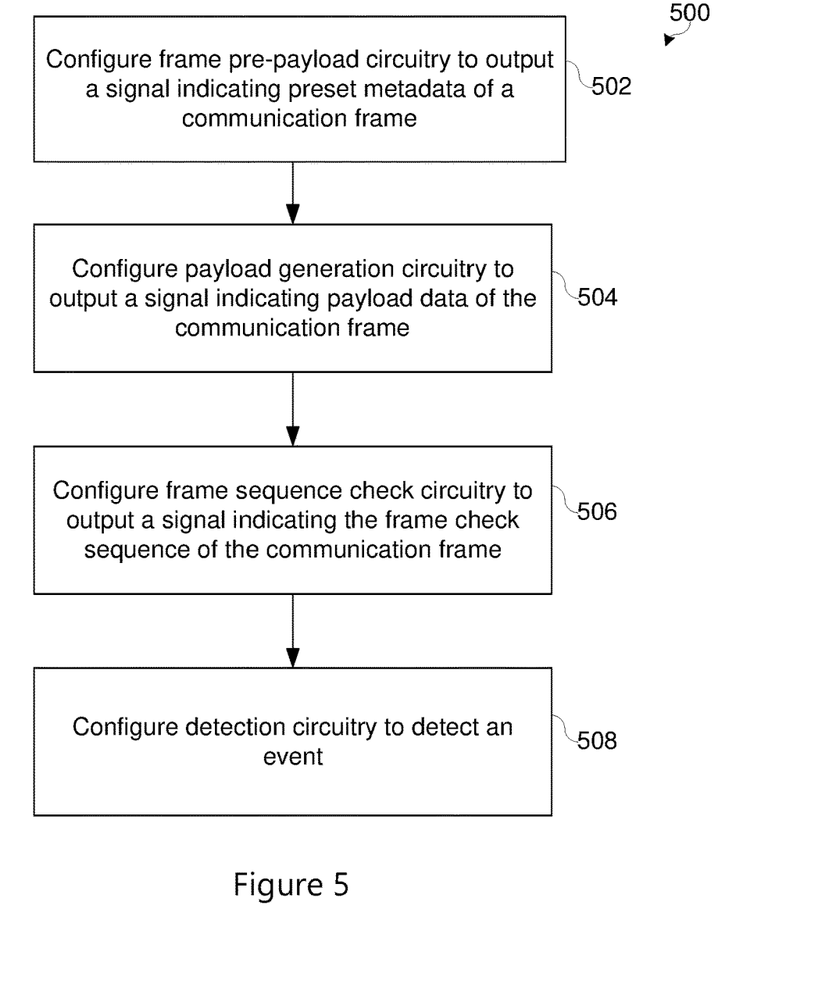
FIG. 5 illustrates a flow diagram of a process to configure a merging unit that communicates using hardware accelerated communication, in accordance with an embodiment.

FIG. 5 illustrates a flow chart of a process 500 that may be performed in configuration of a sending device, such as the merging unit 272 or the IED 120. For example, the FPGA 306 or 356 may be "field-programmed" using a hardware description language (HDL) or any other suitable method in which hardware interconnections are specified and formed on the FPGA 306 and 356 prior to commissioning. The process 500 may begin by configuring (e.g., interconnecting logic gates) the frame pre-payload circuitry to output a first signal indicating preset metadata of a communication frame (block 502). For example, the FPGA may be configured to output preset values for the mac addresses, VLAN, and Ethertype fields of a communication frame upon receiving a signal from the detection circuitry.

The process 500 may include configuring the payload generation circuitry to output a second signal indicating payload data of the communication frame (block 504). The process 500 further includes configuring FCS circuitry to output a third signal indicating the FCS of the communication frame (block 506). Configuration of the FPGA may include interconnecting the FCS circuitry with the payload generation circuitry and the pre-payload circuitry to receive data from the pre-payload circuitry and the payload generation circuitry to allow calculation of the FCS portion of the communication frame.

The process 500 may include configuring the detection circuitry to detect an event of the electric power signal and to output a fourth signal indicating the detected event to one or more of the pre-payload circuitry, the payload generation circuitry, and the FCS circuitry (block 508). For example, if current exceeds a desired threshold, the detection circuitry may send a signal to the pre-payload circuitry, the payload generation circuitry, and the FCS circuitry indicating that a communication frame will be communicated. While the illustrated embodiment includes detection circuitry that is described as detecting current over a threshold in the electric power signal, any suitable event (e.g., threshold changes in current/voltage, current/voltage over time detection, periodic intervals, etc.) to communicate data may be used. While the steps of the process 500 in the illustrated embodiment are shown in a particular order, this is meant to be an example and the FPGA may be configured in any suitable order. Because the FPGA in the illustrated embodiments uses the hardware (e.g., configuration of logic gates) of the FPGA, the pre-payload data, the payload data, and the FCS data may be processed in the corresponding hardware (e.g., in parallel and/or as data is received). Further, by processing portions of the communication frames using corresponding hardware, the sending device may communicate frames to the receiving devices faster than processor-based communication frames While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A merging unit configured to communicate a plurality of communication frames, comprising:
   input circuitry configured to receive a monitoring signal indicating an electrical characteristic of a power line;
   pre-payload circuitry configured to generate at least portions of preset metadata in a first communication frame that are set to identical values in a second communication frame in the plurality of communication frames sent to a receiving device, wherein the pre-payload circuitry is configured to output the preset metadata in each communication frame in the plurality of communication frames by setting electrical connections of hardware of the merging unit to generate signals representative of the identical values independent of clock cycles of a processor of the merging unit;
   payload generation circuitry configured to generate payload data of each communication frame in the plurality of communication frames based at least in part on the electrical characteristic; and
   a communication interface configured to send each communication frame in the plurality of communication frames to a receiving device.

2. The merging unit of claim 1, comprising detection circuitry configured to detect an event of the power line, wherein the pre-payload circuitry is configured to send, via the communication interface, the preset metadata upon detection of the event.

3. The merging unit of claim 1, wherein the payload generation circuitry is configured to generate the payload data during the output of the preset metadata of the communication frame.

4. The merging unit of claim 1, wherein the communication interface is configured to send the communication frame to a communication interface of the receiving device via a fiber optic connection.

5. The merging unit of claim 1, wherein the pre-payload circuitry and the payload generation circuitry are configured to generate the preset metadata and the payload data of the communication frame according to a message standard.

6. The merging unit of claim 5, wherein the message standard comprises an Ethernet standard, Generic Object-Oriented Substation Event (GOOSE) standard, or International Electrotechnical Commission 61850 (IEC-61850) standard.

7. The merging unit of claim 1, wherein the input circuitry comprises an analog to digital converter configured to:
   receive an analog signal that indicates a current of the power line or the voltage of the power line;
   convert the analog signal into the monitoring signal indicating the electrical characteristic of the power line; and
   provide the monitoring signal to a field-programmable gate array (FPGA) of the merging unit to allow the payload generation circuitry to generate the payload of the communication frame.

8. The merging unit of claim 1, comprising frame check sequence (FCS) circuitry configured to calculate FCS data based at least in part on the payload data and the preset metadata and to output a signal indicating the FCS data of the communication frame.

9. A method, comprising:
   configuring, on an integrated circuit, pre-payload circuitry to output preset metadata in a first communication frame that is set to identical values in a second communication frame to be sent to a receiving device, wherein the pre-payload circuitry is configured to output the preset metadata in each of the first communication frame and the second communication frame by configuring electrical connections of hardware to generate signals representative of the identical values independent of clock cycles of a processor of the integrated circuit; and
   configuring, on the integrated circuit, payload generation circuitry to output payload data of each of the first communication frame and the second communication frame.

10. The method of claim 9, comprising configuring frame sequence check (FCS) circuitry to calculate FCS data based at least in part on the payload data and the preset metadata and to output a signal indicating FCS data of the communication frame.

11. The method of claim 9, comprising configuring detection circuitry that detects an event.

12. The method of claim 11, wherein the electrical characteristic comprises a current or a voltage of the electric power signal.

13. The method of claim 11, wherein the payload generation circuitry is configured to generate the payload based on the characteristic of the electric power signal.

14. A field-programmable gate array (FPGA), comprising:
   pre-payload circuitry configured to output a first signal indicating at least portions of a first communication frame that are preset to identical values in a second communication frame sent to a receiving device, wherein the pre-payload circuitry is configured to output the portions in each communication frame that are preset by programming electrical connections of hardware of the FPGA to generate signals representative of the identical values during hardware programming of the FPGA; and
   payload generation circuitry configured to output a second signal indicating at least portions of payload data in each communication frame.

15. The FPGA of claim 14, wherein the preset portions comprise a preamble, a mac address of the merging unit, a mac address of an intelligent electronic device (IED), an ethertype of the communication frame, or any combination thereof.

16. The FPGA of claim 14, wherein the payload generation circuitry is configured to receive a digital signal indicating an electrical characteristic of a power line and to provide the payload data indicating the electrical characteristic.

17. The system FPGA of claim 16, wherein the payload generation circuitry is configured to convert data communicated in the digital signal into the payload of data in the communication frame.

18. The FPGA of claim 14, wherein the electrical connections of hardware of the FPGA are programmed via a hardware descriptor language to generate the identical values.

19. An intelligent electronic device (TED), comprising:
   pre-payload circuitry configured to output a first signal indicating at least portions of a communication frame that are preset to identical values in a second communication frame sent to a receiving device, wherein the pre-payload circuitry is configured to output the portions of each communication frame that are preset by setting electrical connection of hardware of the IED to generate signals representative of the identical values independent of clock cycles of a processor of the IED; and payload generation circuitry configured to output a second signal indicating payload data of each communication frame that cause a protection action on an electric power delivery system.

20. The TED of claim 19, wherein the TED is configured to send the first signal and the second signal to a merging unit to cause the merging unit to trip a circuit breaker of the electric power delivery system.

21. The TED of claim 19, wherein the pre-payload circuitry comprises a logic circuit separate from the payload generation circuitry.

* * * * *